United States Patent
Peana et al.

(10) Patent No.: US 11,307,482 B2
(45) Date of Patent: Apr. 19, 2022

(54) DYNAMIC PRIVACY USING A SYSTEM INTEGRATED LOUVER FILM STRUCTURE

(71) Applicant: Dell Products L.P., Round Rock, TX (US)

(72) Inventors: Stefan Peana, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 16/537,771

(22) Filed: Aug. 12, 2019

(65) Prior Publication Data

US 2021/0048722 A1    Feb. 18, 2021

(51) Int. Cl.
*G02F 1/29* (2006.01)

(52) U.S. Cl.
CPC ..................... *G02F 1/29* (2013.01)

(58) Field of Classification Search
CPC ...... G02B 26/02; G02B 26/023; G02B 26/04; G02B 30/24; G02B 26/00; G02B 26/0841; G02B 2027/0118; G02B 26/007; G02B 26/0816; G02B 26/0833; G02B 27/0068; G02B 30/25; G02B 26/005; G02B 30/31; G02B 30/34; G02B 27/0093; G02B 27/02; G02B 2006/12135; G02B 2006/12145; G02B 2006/12159; G02B 2027/0178; G02B 26/004; G02B 27/017; G02B 27/288; G02B 3/14; G02B 30/27; G02B 5/208; G02B 5/281; G02B 5/3058; G02B 6/0036; G02B 6/005; G02B 6/122; G02F 1/29; G02F 1/292; G02F 1/134309; G02F 1/155; G02F 1/13471; G02F 2203/24; G02F 1/133606; G02F 1/1343; G02F 1/134363; G02F 2201/123; G02F 1/1313; G02F 1/133; G02F 1/1334; G02F 1/133555; G02F 1/134372; G02F 1/13624; G02F 1/13793; G02F 1/13; G02F 1/13306; G02F 1/133342; G02F 1/133512; G02F 1/133601;
(Continued)

(56) References Cited

U.S. PATENT DOCUMENTS

2017/0168633 A1*   6/2017   Kwak ................. G02F 1/13338

OTHER PUBLICATIONS

Lee, Yong-Min, et al. "Fast bistable microlens arrays based on a birefringent layer and ferroelectric liquid crystals." *Japanese Journal of Applied Physics* 47.8R (2008): 6343; 4 pages.

* cited by examiner

*Primary Examiner* — Brandi N Thomas
(74) *Attorney, Agent, or Firm* — Baker Botts L.L.P.

(57) ABSTRACT

A louver film display structure, including: a first and a second electrode; a plurality of louver structures extending between the first and the second electrodes light transmissive elements positioned between adjacent louver structures of the plurality of louver structures, wherein: when a first voltage level is applied to the first and the second electrodes, the louver structures provide a first viewing angle of each unit area of light of each light transmissive element based on a first state of the louver structures, and when a second voltage level is applied to the first and the second electrodes, the louver structures provide a second viewing angle of each unit area of light of each light transmissive element based on a second state of the louver structures, wherein the first voltage level is greater than the second voltage level and the second viewing angle is greater than the first viewing angle.

9 Claims, 7 Drawing Sheets

(58) Field of Classification Search
CPC ........ G02F 1/1347; G02F 1/163; G02F 1/017;
G02F 1/055; G02F 1/133528; G02F
1/133707; G02F 1/13394; G02F
1/136218; G02F 1/136286; G02F 1/1391;
G02F 1/1395; G02F 1/15; G02F 1/19;
G02F 2203/11; G02F 2203/12; G02F
2203/52; G02F 1/0009; G02F 1/011;
G02F 1/0113; G02F 1/0136; G02F
1/0147; G02F 1/1323; G02F 1/1333;
G02F 1/133345; G02F 1/133357; G02F
1/1335; G02F 1/133504; G02F 1/133514;
G02F 1/133607; G02F 1/133615; G02F
1/13378; G02F 1/13398; G02F 1/134318;
G02F 1/134381; G02F 1/13475; G02F
1/135; G02F 1/136; G02F 1/136222;
G02F 1/13725; G02F 1/153; G02F 1/167;
G02F 1/1676; G02F 1/172; G02F 1/212;
G02F 1/225; G02F 1/3136; G02F
2201/503; G02F 2202/36; G02F 2203/21
See application file for complete search history.

DISPLAY
TOP VIEW

DYNAMIC PRIVACY USING A SYSTEM INTEGRATED LOUVER FILM STRUCTURE

BACKGROUND

Field of the Disclosure

The disclosure relates generally to information handling systems, and in particular, adjusting a louver film display structure of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include display devices that provide for display information (e.g., text, images, video) for consumption by a user of the information handling system. Display designs are made to output a flat image at an angle perpendicular to the display device. Such designs ensure that one or more multiple viewers are able to see the screen image, or an acceptable viewing of the screen image. In cases where only one user is viewing the display device, it can be desired to have the image optimized for the single viewer. However, when a user wants to view a document provided for display by the display device in a public place, the user may want to narrow the image output such as to prevent unwanted viewing of the document by other persons proximate to the displace device.

SUMMARY

Innovative aspects of the subject matter described in this specification may be embodied in louver film display structure, including: a first electrode; a second electrode; a plurality of louver structures extending between the first and the second electrodes; a plurality of light transmissive elements positioned between adjacent louver structures of the plurality of louver structures, wherein: when a first voltage level is applied to the first and the second electrodes, the louver structures provide a first viewing angle of each unit area of light of each light transmissive element based on a first state of the louver structures, and when a second voltage level is applied to the first and the second electrodes, the louver structures provide a second viewing angle of each unit area of light of each light transmissive element based on a second state of the louver structures, wherein the first voltage level is greater than the second voltage level and the second viewing angle is greater than the first viewing angle.

These and other embodiments may each optionally include one or more of the following features. For instance, wherein each of the louver structures of the plurality of louver structures includes a first segment and a second segment and includes an electrophoretic material, wherein: when the first voltage level is applied to the first and the second electrodes, the electrophoretic material of the first and the second segments of the plurality of louver structures are in an energized state, wherein the first viewing angle of each unit area of light of each light transmissive element is based on the energized state of the electrophoretic material within the first and the second segments of each louver structure of the plurality of louver structures, and when the second voltage level is applied to the first and the second electrodes, the electrophoretic material of the first segment of the plurality of louver structures are in the energized state and the electrophoretic material of the second segment of the plurality of louver structure are in a de-energized state, wherein the second viewing angle of each unit area of light of each light transmissive element is based on the energized state of the electrophoretic material within the first segment of each louver structure of the plurality of louver structures. A light transparency of each louver structure of the plurality of louver structures is based on the energization of the electrophoretic material within each segment of each louver structure of the plurality of louver structures. When the electrophoretic material is in the energized state, the segment of the louver structure including the energized electrophoretic material is substantially opaque. When the electrophoretic material is in the de-energized state, the segment of the louver structure including the de-energized electrophoretic material is substantially transparent. When the voltage source ceases to apply a voltage level to the first and the second electrodes, each of the louvers of the plurality of louver structures is substantially transparent and a viewing angle of each unit area of light of each light transmissive element is a maximum viewing angle of the louver film display structure. When the voltage source ceases to apply a voltage level to the first and the second electrodes, the electrophoretic material of the first segment and the second segment of the plurality of louver structures are in the de-energized state. When the voltage source increases the voltage level applied to the first and the second electrodes, the collimation of each unit area of light of each light transmissive element increases correspondingly.

Innovative aspects of the subject matter described in this specification may be embodied in a method of adjusting a louver film display structure, comprising: applying, at a first time, a first voltage level to electrodes of the louver film display structure of an information handling system (IHS) such that each louver structure of a plurality of louver structures positioned between the first and the second electrodes is in a first state, wherein a first viewing angle of each unit area of light of each light transmissive element positioned between adjacent louver structures of the plurality of louver structures is based on the first state of the louver structures; identifying a computing context parameter of the IHS including the louver film display structure; in response to identifying the computing context parameter of the IHS, adjusting the louver film display structure at a second time after the first time, including: applying a second voltage level, based on the computing context parameter, to the electrodes such that the each louver structure of the plurality of louver structures is in a second state, wherein a second viewing angle of each unit area of light of each light transmissive element is based on the second state of the louver structures, wherein the second voltage level is greater than the first voltage level and the first viewing angle is greater than the second viewing angle.

These and other embodiments may each optionally include one or more of the following features. For instance, applying the first voltage level further includes applying the first voltage such that an electrophoretic material of a first segment of each louver structure is in an energized state and a second segment of each louver structure is in a de-energized state, wherein the first viewing angle of each unit area of light of each light transmissive element is based on the energized state of the electrophoretic material within the first segment of each louver structure, and wherein applying the second voltage level further includes applying the second voltage such that the electrophoretic material of the first segment and the second segment of each louver structure is in the energized state, wherein the second viewing angle of each unit area of light of each light transmissive element is based on the energized state of the electrophoretic material within the first and the second segments of each louver structure. Identifying a location of a user of the IHS and user input of the user. Identifying a data type of information provided for display by the display structure. Identifying a proximity of one or more other individuals to the IHS. Identifying a class of information provided for display by the display structure. A light transparency of each louver structure of the plurality of louver structures is based on the energization of the electrophoretic material within each segment of each louver structures of the plurality of louver structures. When the electrophoretic material is in the energized state, the segment of the louver structure including the energized electrophoretic material is substantially opaque. When the electrophoretic material is in the de-energized state, the segment of the louver structure including the de-energized electrophoretic material is substantially transparent. When the voltage source ceases to apply a voltage level to the first and the second electrodes, each of the louver structures of the plurality of louver structures is substantially transparent and a viewing angle of each unit area of light of each light transmissive element is a maximum viewing angle of the louver film display structure. When the voltage source ceases to apply a voltage level to the first and the second electrodes, the electrophoretic material of the first segment and the second segment of the plurality of louver structures are in the de-energized state.

Innovative aspects of the subject matter described in this specification may be embodied in an information handling system, comprising: a voltage source; a louver film display structure, including: a first electrode; a second electrode; a plurality of louver structures extending between the first and the second electrodes; a plurality of light transmissive elements positioned between adjacent louver structures of the plurality of louver structures, wherein: when a first voltage level is applied to the first and the second electrodes, the louver structures provide a first viewing angle of each unit area of light of each light transmissive element based on a first state of the louver structures; and when a second voltage level is applied to the first and the second electrodes, the louver structures provide a second viewing angle of each unit area of light of each light transmissive element based on a second state of the louver structures, wherein the first voltage level is greater than the second voltage level and the second viewing angle is greater than the first viewing angle.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a system and a method for enabling a display device of an information handling system to dynamically vary a viewing angle of the display device based on a viewer location and/or other user inputs. Specifically, the display device can include a louver film structure that includes micro-rods that are filled with electrophoretic material. Various levels of voltages can be applied to the micro-rods that can determine a level of the electrophoretic material filling the micro-rods and determine a ratio of opacity and transparency of the micro-rods.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-12 wherein like numbers are used to indicate like and corresponding parts.

Figure 1:
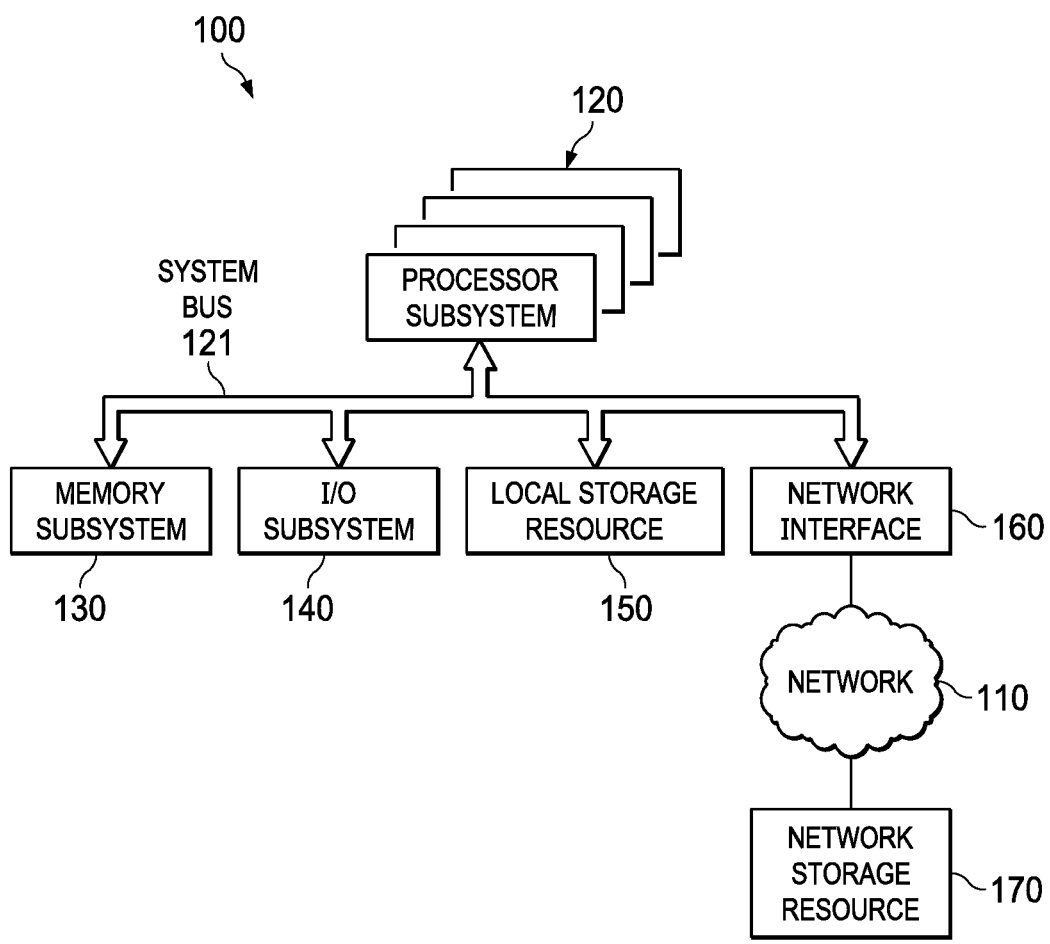
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
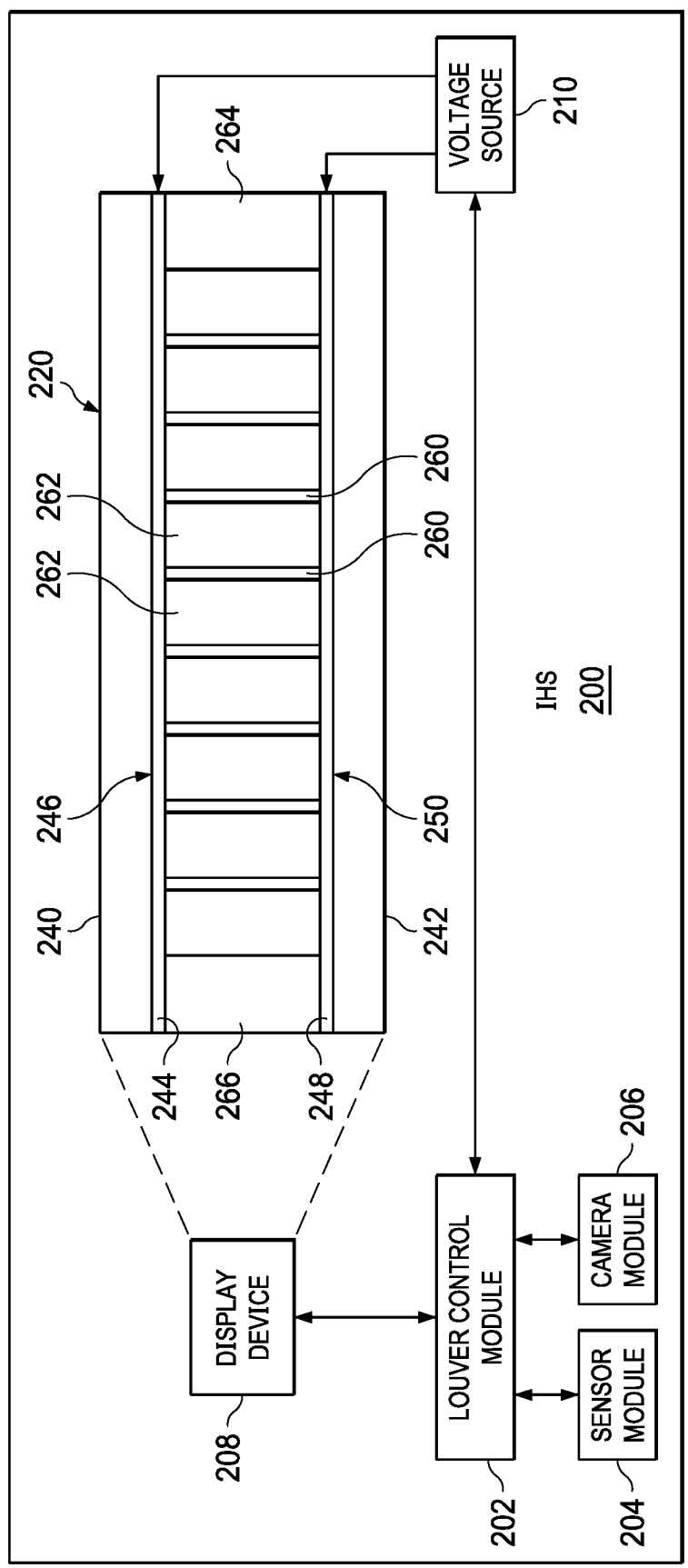
FIG. 2 is a block diagram of an information handling system including a louver film display structure.

Turning now to FIG. 2, FIG. 2 illustrates an information handling system (IHS) 200 for adjusting a louver film display structure 220. Specifically, the IHS 200 can include a louver control module 202, a sensor module 204, a camera module 206, a display device 208, and a voltage source 210. The louver control module 202 can be in communication with the sensor module 204, the camera module 206, the display device 208, and the voltage source 210. The display device 208 can include the louver film display structure 220. The voltage source 210 can be in communication with the louver film display structure 220. The IHS 200 can be similar to the information handling system 100 of FIG. 1.

The display device 208 can provide for display a graphical user interface (GUI)—e.g., for utilization by a user of the IHS 200. In some examples, the louver film display structure 220 can be positioned between a backlight (e.g., 2D backlight) and a display of the IHS 200. In some examples, the louver film display structure 220 can be positioned between above or below a polarizer of the display device 208. The louver film display structure 220 can be used to direct the light output from the backlight through the display, described further herein.

The louver film display structure 220 can include a first substrate 240 and a second substrate 242. The second substrate 242 can be spaced-apart from the first substrate 240 a distance. In some examples, the louver film display structure 220 can be approximately 10 to 20 microns in size, or smaller, e.g., between outer surfaces of the first substrate 240 and the second substrate 242.

The louver film display structure 220 can further include a first electrode 244 positioned on a first side 246 of the first substrate 240. The louver film display structure 220 also includes a second electrode 248 positioned on a first side 250 of the second substrate 242. The first side 250 of the second substrate 242 can face the first side 246 of the first substrate 240.

Figure 3:
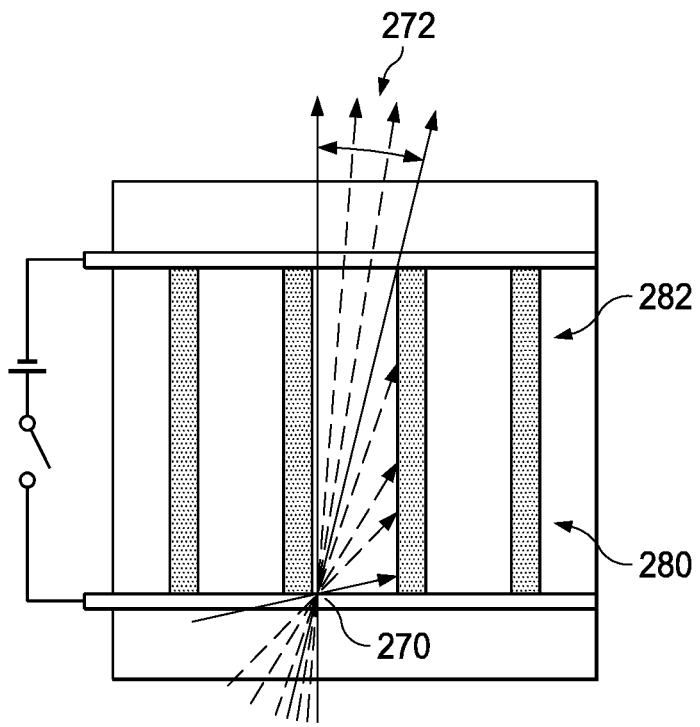
FIGS. 3-5 are louver film display structures having differing viewing angles.
Figure 4:
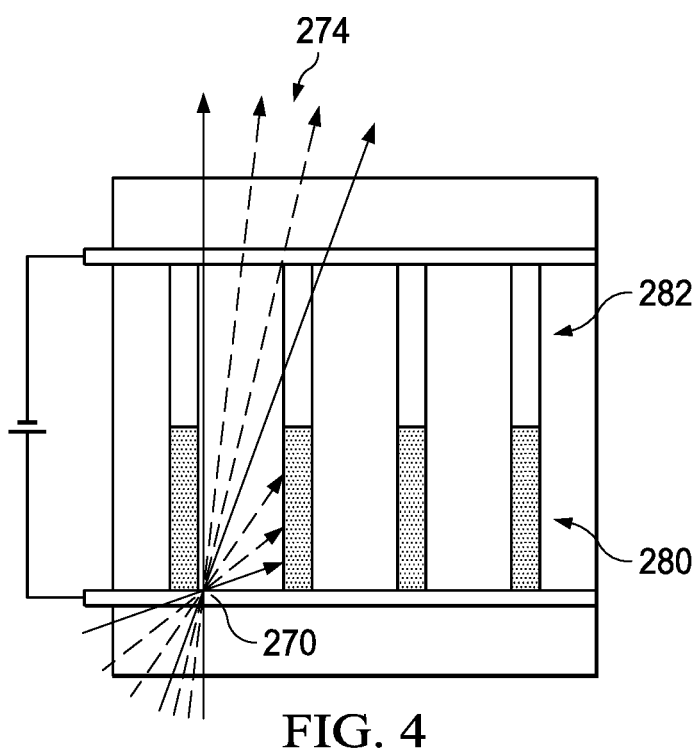
Figure 5:
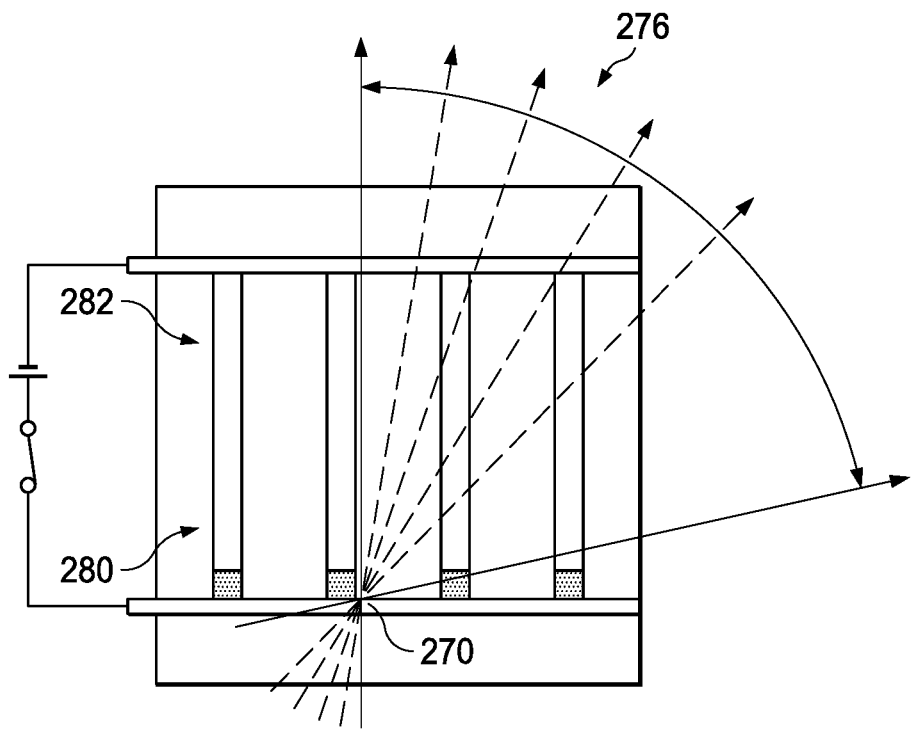

The louver film display structure 220 can further include a plurality of micro-rods 260 (or louver structures 260) that extend between the first electrode 244 and the second electrode 248. Each of the micro-rods 260 can include a first segment 280 and a second segment 282, as shown in FIGS. 3-5. In some examples, the segments 280, 282 are physically separated.

Additionally, the micro-rods 260 can include an electrophoretic material, i.e., the micro-rods 260 can be filled with the electrophoretic material. The micro-rods 260 can be in electrical communication and coupled to each of the first electrode 244 and the second electrode 248. That is, the first electrode 244 and the second electrode 248 can facilitate creating a voltage difference within the micro-rods 260 for transmission of an electric current through the micro-rods 260, described further herein.

The louver film display structure 220 can further include a plurality of light transmissive elements 262 positioned between adjacent micro-rods 260. Specifically, the micro-rods 260 and the light transmissive elements 262 alternate such that there are discrete steps of light blocking and variable angular light output control, described further herein. The light transmissive elements 262 can facilitate transmission of light from the backlight (not shown).

The louver film display structure 220 can further include seals 264, 266 positioned at opposite ends of the louver film display structure 220.

The voltage source 210 can apply a voltage to the micro-rods 260, and in particular, the first electrode 244 and the second electrode 248, to adjust a state of the electrophoretic material within the micro-rods 260. Specifically, when a voltage is applied across the micro-rods 260, the electrophoretic material can react to such voltage and become energized such that the electrophoretic material adjusts a transparency and opacity ratio of the micro-rods 260. In some examples, the voltage source 210 apples the voltage to the first electrode 244 and the second electrode 248 in response to an instruction from the louver control module 202, described further herein.

In some examples, in response to the voltage being applied to the first electrode 244 and the second electrode 248, the electrophoretic material within the micro-rods 260 can change states to an energized state or to a de-energized state. When the electrophoretic material is in in the energized state, the segment(s) of the micro-rods 260 that includes the electrophoretic material can be substantially opaque. When the electrophoretic material is in the de-energized state, the segment(s) of the micro-rods 260 that includes the electrophoretic material can be substantially transparent. In some examples, one or both of the segments 280, 282 can include electrophoretic material that is in an energized state. In some examples, one or both of the segments 280, 282 can include electrophoretic material that is in a de-energized state. In some examples, one of the segments 280, 282 includes electrophoretic material that is in an energized state and the remaining segment 280, 282 includes electrophoretic material that is a de-energized state.

For example, the voltage source 210 can apply a first voltage level to the first electrode 244 and the second electrode 248. In response to the first voltage level, the electrophoretic material of the first segment 280 and the second segment 282 of each micro-rod 260 are in an energized state, as shown in FIG. 3. Specifically, the electrophoretic material becomes energized in response to the first voltage level and becomes substantially opaque.

Furthermore, the viewing angle of each unit area of light of each light transmissive element 262 is based on the energized state of the electrophoretic material within the first segment 280 and the second segment 282 of each micro-rod 260. Specifically, as the electrophoretic material of each of the segments 280, 282 becomes energized, the micro-rods 260 can adjust the viewing angle of each unit area of light of each light transmissive element 262. That is, as the electrophoretic material of each of the segments 280, 282 becomes energized, each unit area of light of each light transmissive element 262 is increasing shielded, and the viewing angle of each unit area of light of each light transmissive element 262 is decreased. Specifically, as the electrophoretic material of each of the segments 280, 282 becomes energized, the micro-rods increase a collimation of the light of each unit area of light of each light transmissive element 262.

To that end, when the electrophoretic material of each of the segments 280, 282 becomes energized and is in the first state such that the micro-rods 260 are substantially opaque, each unit area of light of each light transmissive element 262 can have a first viewing angle. Referring to FIG. 3, for example, a particular unit area of light 270 of the light transmissive element 262 can have a first viewing angle 272. That is, the particular unit area of light 270 is only viewable within the first viewing angle 272 when the electrophoretic material of each of the segments 280, 282 becomes energized and are in the first state such that the micro-rods 260 are substantially opaque, e.g., by a user positioned proximate to the display device 208 and within the first viewing angle 272. The particular unit area of light 270 is "shielded" from view outside of the first viewing angle 272.

Furthermore, for example, the voltage source 210 can apply a second voltage level to the first electrode 244 and the second electrode 248. In response to the second voltage level, the electrophoretic material of the first segment 280 of each micro-rod 260 is in an energized state and the electrophoretic material of the second segment 282 of each micro-rod is in a de-energized state, as shown in FIG. 4. Specifically, the electrophoretic material of the first segment 280 becomes energized in response to the second voltage level and becomes substantially opaque, while the electrophoretic material of the second segment 282 becomes de-energized.

Furthermore, the viewing angle of each unit area of light of each light transmissive element 262 is based on the energized state of the electrophoretic material within the second segment 282 of each micro-rod 260. Specifically, as the electrophoretic material of each of the segments 282 becomes energized, the micro-rods 260 can adjust the angle viewing angle of each unit area of light of each light transmissive element 262. That is, as the electrophoretic material of each of the segments 282 becomes energized, each unit area of light of each light transmissive element 262 is decreasing shielded, and the viewing angle of each unit area of light of each light transmissive element 262 is decreased.

Similarly, when the electrophoretic material of the first segment 280 becomes energized and is in the first state such that the first segment 280 of the micro-rods 260 are substantially opaque, each unit area of light of each light transmissive element 262 can have a second viewing angle. Referring to FIG. 4, for example, the particular unit area of light 270 of the light transmissive element 262 can have a second viewing angle 274. That is, the particular unit area of light 270 is only viewable within the second viewing angle 274 when the electrophoretic material of the first segment 280 becomes energized and is in the first state such that the first segment 280 of the micro-rods 260 are substantially opaque, e.g., by a user positioned proximate to the display device 208 and within the second viewing angle 274. The particular unit area of light 270 is "shielded" from view outside of the second viewing angle 274.

In some examples, the first voltage level is greater than the second voltage level. As a result, the second viewing angle 274 is greater than the first viewing angle 272. That is, the first voltage level energizes the electrophoretic material of the first segment 280 and the second segment 282; while the second voltage level energizes the electrophoretic material of the first segment 280 while the electrophoretic material of the second segment 282 is de-energized. Thus, the first viewing angle 272 (corresponding to the first voltage level) is less than the second viewing angle 274 (corresponding to the second voltage level).

In some examples, in response to a voltage level that is applied to the first electrode 244 and the second electrode 248, a subset of the micro-rods 260 may be opaque (or substantially opaque)—e.g., the electrophoretic material of the first segment 280 and the second segment 282 is in the energized state. The remaining micro-rods 260 can be transparent (or substantially transparent)—e.g., the electrophoretic material of the first segment 280 and the second segment 282 is in the de-energized state. For example, the micro-rods 260 can alternate between being opaque (or substantially opaque) and transparent (or substantially transparent).

In some examples, when the voltage level that is applied by the voltage source 210 increases (e.g., from the second voltage level to the first voltage level) that is applied to the first electrode 244 and the second electrode 248, the collimation of each unit area of light of each light transmissive element 262 increases correspondingly.

In some examples, the voltage source 210 can cease to apply a voltage level to the first electrode 244 and the second electrode 248. When the voltage source 210 ceases to apply the voltage level to the first electrode 244 and the second electrode 248, the electrophoretic material of the first segment 280 and the second segment 282 of the micro-rods 260 are in the de-energized state. To that end, as the electrophoretic material is not energized within the micro-rods 260, each of the micro-rods 260 is substantially transparent and the viewing angle of each unit area of light of each light transmissive element 262 is a maximum viewing angle. Referring to FIG. 5, for example, the particular unit area of light 270 of the light transmissive element 262 can have a third viewing angle 276. That is, the particular unit area of light 270 is only viewable within the third viewing angle 276 when the electrophoretic material is de-energized within the micro-rods, e.g., by a user positioned proximate to the display device 208 and within the third viewing angle 276.

Figure 6:
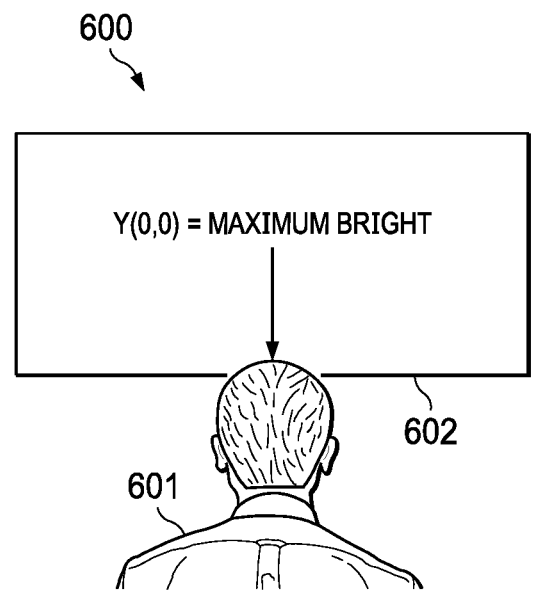
FIGS. 6, 8 illustrate diagrams of users with respect to display devices.
Figure 7:
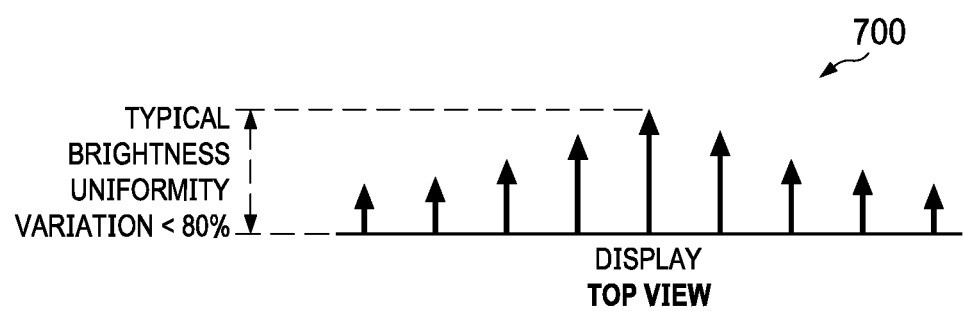
FIGS. 7, 9, 10, 11 illustrate brightness graphs of the display devices.

FIG. 6 illustrates a diagram 600 of a user 601 at a position Y(0,0) with respect to a display 602 (e.g., the display device 208) at a distance viewing distance (e.g., 18-20 inches). Additionally, the display 602 can be associated with a maximum viewing angle, e.g., the third viewing angle 276 of FIG. 5 when the voltage source 210 ceases to apply a voltage level to the first electrode 244 and the second electrode 248 such that the electrophoretic material is de-energized within the micro-rods 260, and the micro-rods 260 are substantially transparent. FIG. 7 illustrates a display chart 700 indicating a positional brightness of the display 602. For example, the display 602 can have an uniform brightness variation across the display 602 and to the edges of the display 602. Thus, there is no "shielding" of the display 602.

Figure 8:
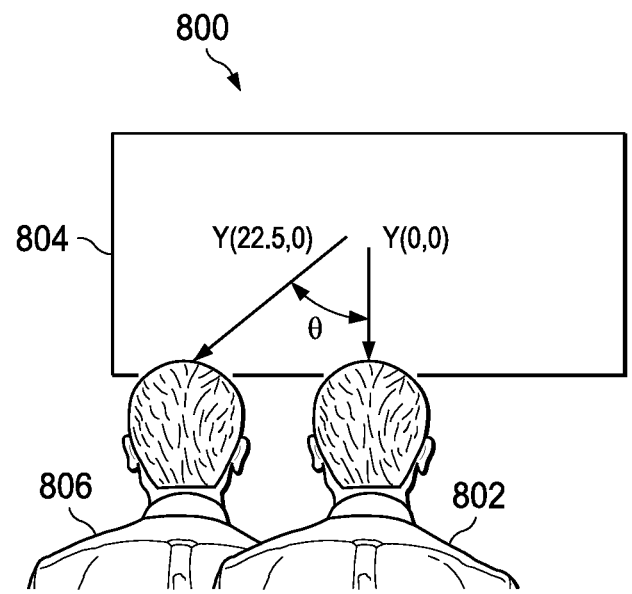

FIG. 8 illustrates a diagram 800 of a first user 802 at a position Y(0,0) with respect to a display 804 (e.g., the display device 208) and a second user 806 at a position Y(22.5,0) with respect to the display 804 (e.g., 18-20 inches). Additionally, the display 804 can be associated with a limited viewing angle, e.g., the first viewing angle 272 of FIG. 3 when the voltage source 210 applies the first voltage level to the first electrode 244 and the second electrode 248 and the electrophoretic material of the first segment 280 and the second segment 282 is energized.

Figure 9:
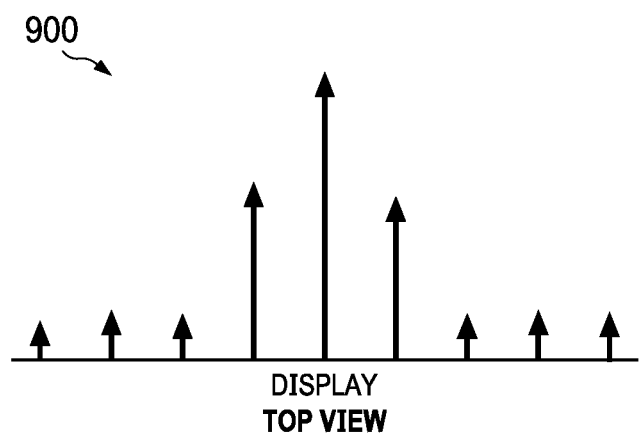

FIG. 9 illustrates a display chart 900 indicating a positional brightness of the display 804. For example, the display 802 can have a maximum brightness proximate to the center of the display 804 (e.g., the position Y(0,0)), and limited brightness towards the edges of the display 804. Thus, the second user 806 can have limited viewing of the display 804 (e.g., at the position Y(22.5,0)) while maintaining viewing by the first user 802 (e.g., at the position Y(0,0)). In other words, the display 804 is set to "privacy mode" to limit viewing of other users that are at angle with respect to the display 804 greater than the first viewing angle.

Figure 10:
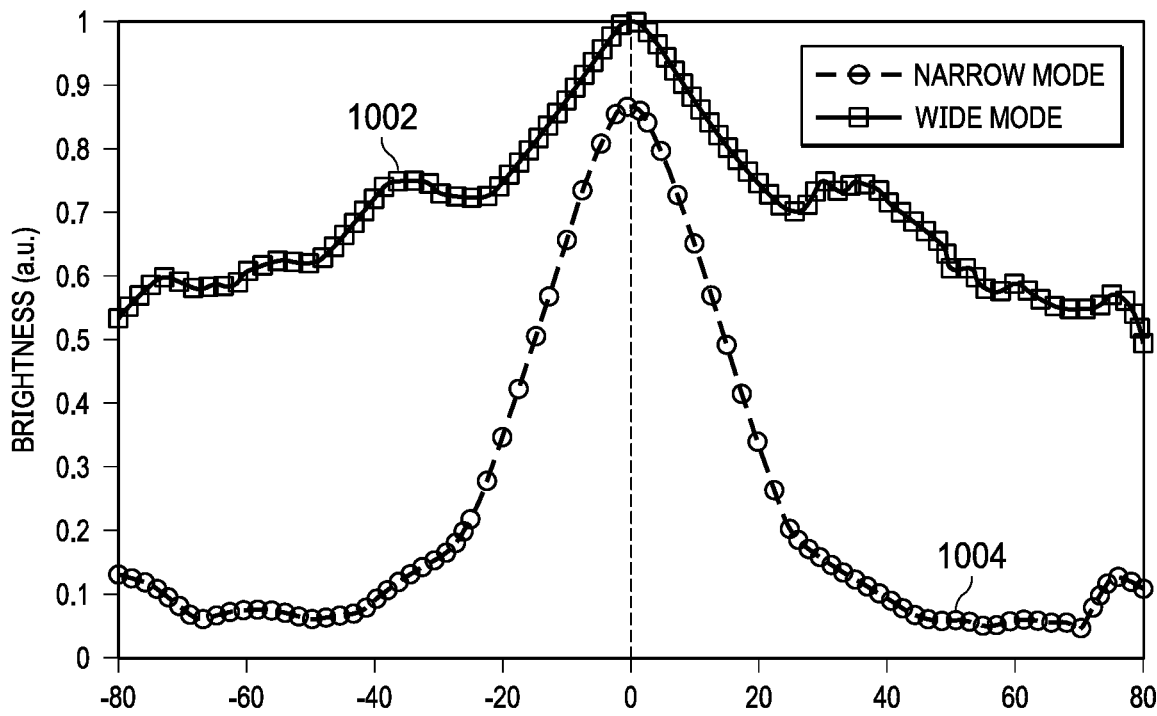

FIG. 10 illustrates a graph 1000 of the brightness of the displays 602, 804 with respect to viewing angle. Specifically, the line 1002 can represent the brightness of the display 602 with respect to the viewing angle of the display 602, and the line 1004 can represent the brightness of the display 804 with respect to the viewing angle of the display 804.

In some examples, a 2D backlight in combination with the louver film display structure 220 can enable a privacy window within the display device 208. Specifically, the privacy window can enable viewing of only content within the privacy window by adjusting a positional brightness of the display structure 220 within the privacy window. For example, the micro-rods 260 associated with the privacy window can be substantially transparent; e.g., the electrophoretic material of the first segment 280 and the second segment 282 of the micro-rods 260 associated with the privacy window are in the de-energized state; and the micro-rods 260 outside of the privacy window can be substantially opaque; e.g., the electrophoretic material of the first segment 280 and the second segment 282 of the micro-rods 260 outside of the privacy window are in the energized state. Further, the 2D backlight provides modulation of the light provided by the display structure 220 such that light is only provided by the 2D backlight for the privacy window.

Figure 11:
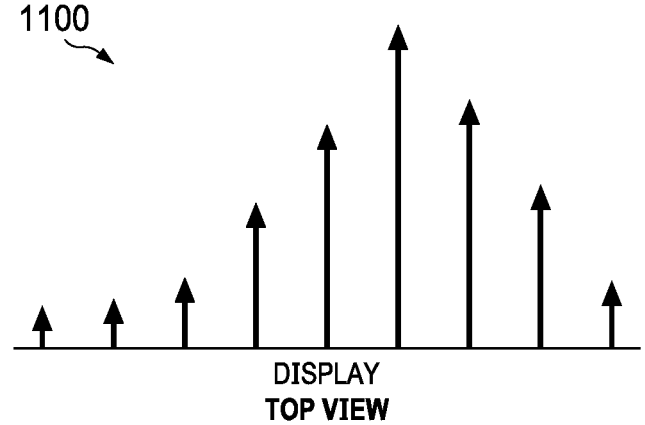

FIG. 11 illustrates a display chart 1100 indicating a positional brightness of the display 602 when the user is at a position off-center from position Y(0,0) and the display 602 is associated with a maximum viewing angle (e.g., the third viewing angle 276 of FIG. 5)). Specifically, the display 602 can have a maximum brightness proximate to an edge of the display 604, with decreasing brightness extending therefrom. For example, the combination of the 2D backlight and the louver film display structure 220 can facilitate having the maximum brightness of the display 604 at the edge of the display, e.g., based on the location of the user. The peak brightness of the display 604 can be adjusted based on the location of the user.

Referring back to FIG. 2, in some implementations, the louver control module 202 can receive contextual information from the sensor module 204 and/or the camera module 206. Specifically, the louver control module 202, based on the contextual information from the sensor module 204 and/or the camera module 206, can automatically adjust the louver film display structure 220 (e.g., "contextual mode.")

In some examples, the louver control module 202 can identify a location of a user (e.g., the user 601) with respect to a display (e.g., the display 602). For example, the camera module 206 can determine the location of the user with respect to the display and provide such information to the louver control module 202. The location of the user can include a distance of the user with respect to the display. The louver control module 202 can further receive user input from the user indicating a user intent—e.g., if sharing of the display is desired for viewing by one or more other users (privacy mode or sharing mode). The louver control module 202 can communicate with the voltage source 210 to adjust the voltage level applied by the voltage source 210 to the first electrode 244 and the second electrode 248 such that a desired viewing angle is achieved. For example, when the user indicates a privacy mode, the louver control module 202 communicates with the voltage source 210 to adjust the voltage level applied by the voltage source 210 to the first electrode 244 and the second electrode 248 such that the micro-rods 260 have a minimum viewing angle (e.g., the first viewing angle 270 of FIG. 3). In some examples, the louver control module 202 can communicate with the voltage source 210 to adjust the voltage level applied by the voltage source 210 to the first electrode 244 and the second electrode 248 such that the micro-rods 250 have a viewing angle based on the distance of the user with respect to the display. For example, as the user is closer to the display, the viewing angle can be increased, and as the user is further from the display, the viewing angle can be decreased. When the user indicates a sharing mode, the louver control module 202 communicates with the voltage source 210 to adjust the voltage level applied by the voltage source 210 to the first electrode 244 and the second electrode 248 such that the micro-rods 260 have a maximum viewing angle (e.g., the third viewing angle 276 of FIG. 5).

In some examples, the louver control module 202 can identify a data type of information provided for display (e.g., the display 602). The louver control module 202, based on the data type of the information provided for display, can communicate with the voltage source 210 to adjust the voltage level applied by the voltage source 210 to the first electrode 244 and the second electrode 248 such that a desired viewing angle is achieved. For example, certain data types can be associated with a privacy mode. In response, the louver control module 202 communicates with the voltage source 210 to adjust the voltage level applied by the voltage source 210 to the first electrode 244 and the second electrode 248 such that the micro-rods 260 have a minimum viewing angle (e.g., the first viewing angle 270 of FIG. 3). For other data types that are not associated with the privacy mode, the louver control module 202 communicates with the voltage source 210 to adjust the voltage level applied by the voltage source 210 to the first electrode 244 and the second electrode 248 such that the micro-rods 260 have a maximum viewing angle (e.g., the third viewing angle 276 of FIG. 5).

In some examples, the louver control module 202 can identify a proximity of one or more other individuals to the display (e.g., the display 602). For example, the camera module 206 can determine the location of other users with respect to the display and provide such information to the louver control module 202. In some examples, the camera module 206 can include an infrared camera and/or 3D camera to detect the presence of the other users with respect to the display. Further, the sensor module 204 can identify audio, or other identifying signals that indicate the presence of the other users with respect to the display and provide such information to the louver control module 202. In response to the detection of a proximity of one or more other individuals to the display, the louver control module 202 can communicate with the voltage source 210 to adjust the voltage level applied by the voltage source 210 to the first electrode 244 and the second electrode 248 such that a desired viewing angle is achieved. For example, the louver control module 202 communicates with the voltage source 210 to adjust the voltage level applied by the voltage source 210 to the first electrode 244 and the second electrode 248 such that the micro-rods 260 have a minimum viewing angle (e.g., the first viewing angle 270 of FIG. 3).

In some examples, the louver control module 202 can identify a class of information provided for display (e.g., the display 602). For example, the class of information can be referenced against a static look up table that indicates that particular files can be tagged as privacy mode. The louver control module 202, based on the class of information provided for display, can communicate with the voltage source 210 to adjust the voltage level applied by the voltage source 210 to the first electrode 244 and the second electrode 248 such that a desired viewing angle is achieved. For example, certain classes of information can be associated with a privacy mode. In response, the louver control module 202 communicates with the voltage source 210 to adjust the voltage level applied by the voltage source 210 to the first electrode 244 and the second electrode 248 such that the micro-rods 260 have a minimum viewing angle (e.g., the first viewing angle 270 of FIG. 3). For other classes of information that are not associated with the privacy mode, the louver control module 202 communicates with the voltage source 210 to adjust the voltage level applied by the voltage source 210 to the first electrode 244 and the second electrode 248 such that the micro-rods 260 have a maximum viewing angle (e.g., the third viewing angle 276 of FIG. 5).

Figure 12:
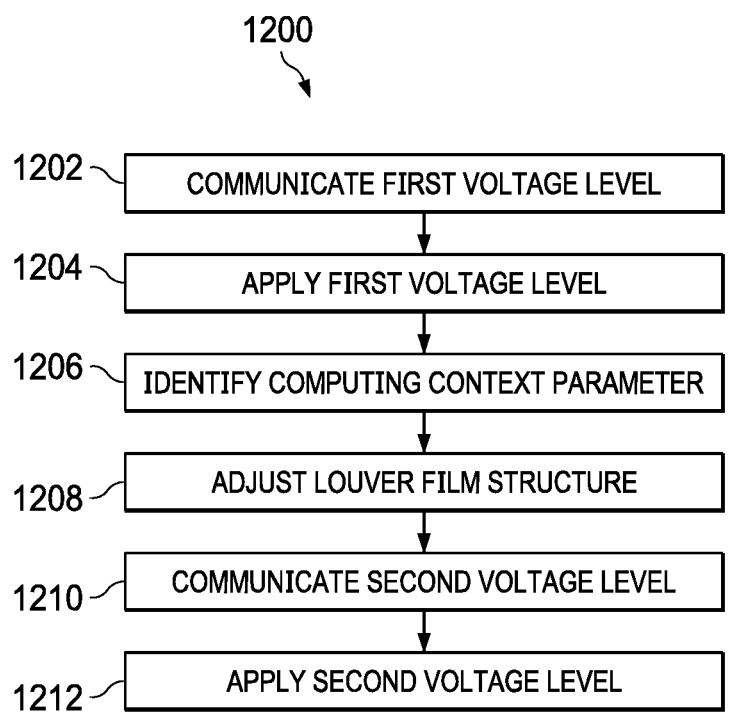
FIG. 12 illustrates a flowchart for adjusting the louver film display structure.

FIG. 12 illustrates a flowchart depicting selected elements of an embodiment of a method 1200 of adjusting the louver film display structure 220. The method 1200 may be performed by the information handling system 100, the voltage source 210, and/or the louver control module 202, described herein with reference to FIGS. 1-11, or another information handling system. It is noted that certain operations described in method 1200 may be optional or may be rearranged in different embodiments.

The louver control module 202 communicates with the voltage source 210 indicating a first voltage level (1202). The voltage source 210 applies, at a first time, the first voltage level to the first electrode 244 and the second electrode 248 (1204). For example, the voltage source 210 can apply the first voltage level in response to the communication from the louver control module 202. The electrophoretic material is in the energized state within the first segment 280 and a de-energized state within the second segment 282. The second viewing angle 272 of each unit area of light of each transmissive element 262 is based on the energized state of the electrophoretic material within the first segment 280 of each micro-rod 260. The louver control module 202 identifies a computing context parameter of the IHS 200 (1206). In response to identifying the computing context parameter of the IHS 200, the louver control module 202 adjusts the louver film display structure 220 at a second time after the first time (1208). The louver control module 202 communicates with the voltage source 210 indicating a second voltage level (1210). In some examples, the second voltage level is based on the computing context parameter. The voltage source 210 applies, at the second time, the second voltage level to the first electrode 244 and the second electrode 248 (1212). For example, the voltage source 210 can apply the second voltage level in response to the communication from the louver control module 202. The electrophoretic material is in the energized state within the segments 280, 282. The first viewing angle 270 of each unit area of light of each transmissive element 262 is based on the energized state of the electrophoretic material within the segments 280, 282 of each micro-rod 260.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A louver film display structure, including:
   a first electrode;
   a second electrode;
   a plurality of louver structures extending between the first and the second electrodes;
   a plurality of light transmissive elements positioned between adjacent louver structures of the plurality of louver structures, wherein:
      when a first voltage level is applied to the first and the second electrodes, the louver structures provide a first viewing angle of each unit area of light of each light transmissive element based on a first state of the louver structures, and
      when a second voltage level is applied to the first and the second electrodes, the louver structures provide a second viewing angle of each unit area of light of each light transmissive element based on a second state of the louver structures,
      wherein the first voltage level is greater than the second voltage level and the second viewing angle is greater than the first viewing angle.

2. The louver film display structure of claim 1, wherein each of the louver structures of the plurality of louver structures includes a first segment and a second segment and includes an electrophoretic material, wherein:
   when the first voltage level is applied to the first and the second electrodes, the electrophoretic material of the first and the second segments of the plurality of louver structures are in an energized state, wherein the first viewing angle of each unit area of light of each light transmissive element is based on the energized state of the electrophoretic material within the first and the second segments of each louver structure of the plurality of louver structures, and when the second voltage level is applied to the first and the second electrodes, the electrophoretic material of the first segment of the plurality of louver structures are in the energized state and the electrophoretic material of the second segment of the plurality of louver structure are in a de-energized state, wherein the second viewing angle of each unit area of light of each light transmissive element is based on the energized state of the electrophoretic material within the first segment of each louver structure of the plurality of louver structures.

3. The louver film display structure of claim 2, wherein a light transparency of each louver structure of the plurality of louver structures is based on the energization of the electrophoretic material within each segment of each louver structure of the plurality of louver structures.

4. The louver film display structure of claim 2, wherein when the electrophoretic material is in the energized state, the segment of the louver structure including the energized electrophoretic material is substantially opaque.

5. The louver film display structure of claim 2, wherein when the electrophoretic material is in the de-energized state, the segment of the louver structure including the de-energized electrophoretic material is substantially transparent.

6. The louver film display structure of claim 1, when the voltage source ceases to apply a voltage level to the first and the second electrodes, each of the louvers of the plurality of louver structures is substantially transparent and a viewing angle of each unit area of light of each light transmissive element is a maximum viewing angle of the louver film display structure.

7. The louver film display structure of claim 2, when the voltage source ceases to apply a voltage level to the first and the second electrodes, the electrophoretic material of the first segment and the second segment of the plurality of louver structures are in the de-energized state.

8. The louver film display structure of claim 1, when the voltage source increases the voltage level applied to the first and the second electrodes, the collimation of each unit area of light of each light transmissive element increases correspondingly.

9. An information handling system, comprising:
a voltage source;
a louver film display structure, including:
a first electrode;
a second electrode;
a plurality of louver structures extending between the first and the second electrodes;
a plurality of light transmissive elements positioned between adjacent louver structures of the plurality of louver structures, wherein:
when a first voltage level is applied to the first and the second electrodes, the louver structures provide a first viewing angle of each unit area of light of each light transmissive element based on a first state of the louver structures; and
when a second voltage level is applied to the first and the second electrodes, the louver structures provide a second viewing angle of each unit area of light of each light transmissive element based on a second state of the louver structures,
wherein the first voltage level is greater than the second voltage level and the second viewing angle is greater than the first viewing angle.

\* \* \* \* \*